(12) United States Patent
Finck et al.

(10) Patent No.: US 7,568,750 B1
(45) Date of Patent: Aug. 4, 2009

(54) CONTROL CONSOLE HAND REST ASSEMBLY

(75) Inventors: Christopher David Finck, Cedar Falls, IA (US); Bruce Kevin Fryk, Waverly, IA (US); Dean Arden Boyce, Waterloo, IA (US); Scott Edward Bender, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 9 days.

(21) Appl. No.: 12/029,091

(22) Filed: Feb. 11, 2008

(51) Int. Cl.
*B62D 33/06* (2006.01)
(52) U.S. Cl. .................. 296/37.8; 296/190.01; 180/315
(58) Field of Classification Search .............. 296/24.34, 296/37.8, 190.01, 152; 297/118; 180/89.12, 180/315, 333
See application file for complete search history.

(56) References Cited

U.S. PATENT DOCUMENTS

| | | | |
|---|---|---|---|
| 5,231,892 A | 8/1993 | Haight | |
| 6,039,141 A * | 3/2000 | Denny | 180/329 |
| 6,634,453 B2 | 10/2003 | Arthur et al. | |
| 6,871,721 B2 * | 3/2005 | Smiley et al. | 180/333 |

* cited by examiner

*Primary Examiner*—Joseph D Pape

(57) ABSTRACT

The invention relates to a control console assembly with a hand rest. There is a need for a control console hand rest which reduces the possibility of unintentional throttle control lever movement. A throttle control lever projects above a console deck. A dome projects from the deck. The lever projects through a slot in a center portion of the dome. The center portion and a first side portion of the dome are connected together by a side wall which faces towards the center portion and lies in a vertical plane. A thumb-receiving recess is formed in a second side portion adjacent to the slot. The deck includes an upper deck and a lower deck. A depression formed by a finger of the lower deck extends around an end of the first portion and is bordered by a side wall. The depression can receive and support part of an operator's hand.

14 Claims, 1 Drawing Sheet

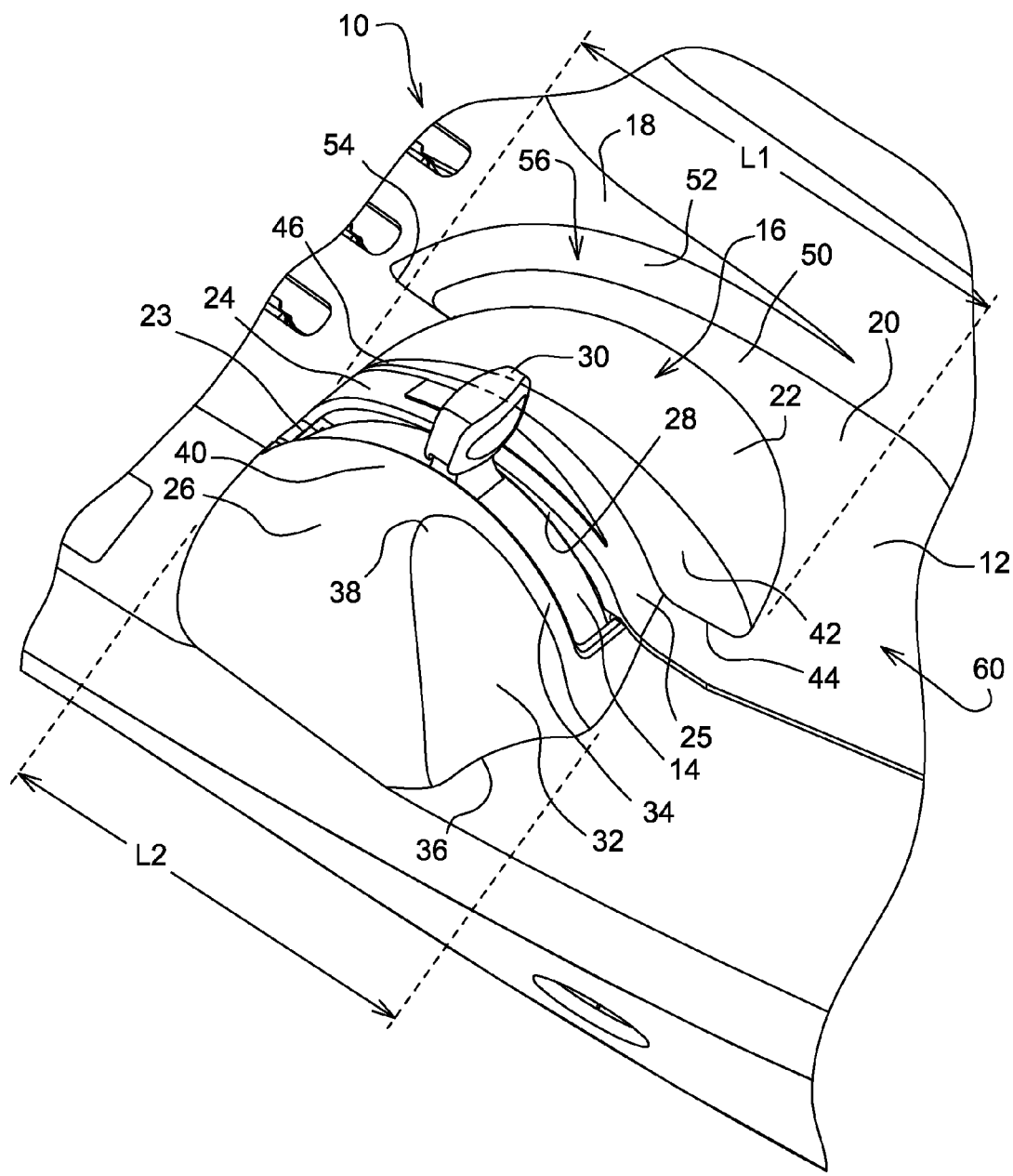

CONTROL CONSOLE HAND REST ASSEMBLY

FIELD OF THE INVENTION

The present invention relates to a control console assembly with a lever hand rest structure.

BACKGROUND OF THE INVENTION

Agricultural and off-road vehicles have normally included engine throttle control levers which protrude through a support console and which are attached to a cable or mechanical linkages which are coupled to the engine throttle. Current consoles include a cylindrical surface which partially encloses the arc of the throttle control lever. This shape has not been designed to specifically fit and support the hand. The lever is rotated about a pivot point which is located a distance below the console surface. To move such levers requires a relative large force and an arm movement by the operator. An operator may rest his or her hand on the lever without causing inadvertent motion of the lever as a result of vehicle vibration caused by rough terrain. Due to new designs for the control, the lever can be significantly shorter, has a pivot center near the top surface of the console, and requires greatly reduced forces to operate. Such newer throttle control levers can be moved by a mere finger tip manipulation. Such easily moved levers should not be used as a hand rest because they can be easily unintentionally moved as a result of vehicle vibrations.

SUMMARY OF THE INVENTION

Accordingly, an object of this invention is to provide a control console which reduces the possibility of unintentional control lever movement.

A further object of the invention is to provide such a control console with a hand rest.

These and other objects are achieved by the present invention, wherein a control console assembly includes a console deck. A control lever rotates about a pivot axis and projects above the deck. A dome projects from the deck. The dome includes a first side portion, a center portion and a second side portion. A slot is formed in the center portion and extends along a longitudinal axis. Part of the control lever projects through the slot. The center portion and the first portion are connected together by a side wall which faces towards the center portion and lies in a vertical plane. A thumb-receiving recess is formed in the second side portion adjacent to the slot. The recess includes a side edge which is generally parallel to the slot. The recess has a concave curved bottom edge where the recess is joined to the deck. The recess extends to an apex adjacent to a top surface of the second side portion. The center portion has a curved surface with a center of curvature at the pivot axis. The dome has a transverse length in a direction transverse to the slot axis and the first portion has a longitudinal length which is parallel to the slot axis. The transverse length is preferably longer than longitudinal length. The deck includes an upper deck and a lower deck. A finger of the lower deck extends around an end of the first portion. The finger is bordered by a side wall. The first portion, the finger, and the side wall form a recess for receiving a base of an operators hand.

BRIEF DESCRIPTION OF THE DRAWINGS

The sole FIGURE is a perspective view of a control console hand rest assembly embodying the invention.

DESCRIPTION OF THE PREFERRED EMBODIMENT

Referring to the sole FIGURE, a control console assembly 10 includes a console deck 12, a control lever 14 and a dome 16. The lever 14 rotates about a pivot axis and projects above the deck 12. The deck includes an upper deck 18 and a lower deck 20.

The upwardly convex dome 16 is curved and projects upwardly from the deck 12. The dome 16 includes a first or right side portion 22 and a second or left side portion 26 separated by a center portion 24. A slot 28 is formed in the center portion 24 and extends in a longitudinal direction. An upper part of the control lever 14 projects through the slot 28 and has a knob 30 mounted thereon. The center portion 24 has a curved cylindrical surface. The front end 23 of the center portion 24 is substantially aligned with the front ends of side portions 22 and 26. The rear end 25 of the center portion 24 is spaced apart or recessed forward from the rear end of side portion 22. The front end of the left side portion 26 is substantially aligned with the front end 23 of center portion 24. The rear end of the left side portion 26 is substantially aligned with the rear end 23 of center portion 24.

A concave digit or thumb-receiving recess 32 is formed in the second side portion 26 adjacent to but spaced apart from the slot 28. The recess 32 includes a side edge 34 which is generally parallel to the slot 28. The recess 32 has a concave curved bottom edge 36 where the recess is joined to the lower deck 20. The recess 32 extends to an apex 38 adjacent to a top surface 40 of the second side portion 26.

The first side portion 22 has a length L1 in a direction parallel to the longitudinal axis which is longer than a corresponding length L2 of the center portion 24. The center portion 24 and the first portion 22 are connected together by a side wall 42. The side wall 42 faces towards the center portion 24 and lies in a vertical plane. Side wall is curved and tapers from a larger bottom edge 44 to an apex 46 which is near the front edge of the dome 16.

The dome 16 has a transverse length in a direction transverse to the slot axis. The first portion 22 has a longitudinal length in a direction parallel to the slot 28. The transverse length of the dome 16 is preferably longer than longitudinal length of first dome portion 22.

The lower deck forms a curved finger 50 which extends around an end of the first dome portion 22. The finger 50 is bordered by a curved side wall 52 and an end wall 54. End wall 54 faces generally away from the plane of the side wall 42. The first portion 22, the finger 50, the side wall 52 and the end wall 54 form a depression 56 for receiving a base of an operator's hand (not shown).

The structures described above form a hand rest 60 which can support an operator's hand while he or she uses the throttle control lever 14 and manipulates the knob 30. The depression 32 is on the inboard side of the throttle knob 30 and can receive the thumb of the operator's hand. With this hand rest 60, the operator can use the thumb and fore-finger to accurately control the engine throttle lever 14 even when the vehicle is moving over rough terrain.

This hand rest 60 helps maintain a consistent hand-to-control lever relationship so the operator does not need to look to find the lever to adjust the position of the lever. The hand rest 60 also provides the operator a known position for his hand relative to other controls located on the console. This will allow the operator to keep his vision focused on other areas while operating the machine.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A control console assembly comprising:
a console deck;
a dome projecting from the deck, the dome having a first side portion, a center portion and a second side portion, the dome having a slot formed in the center portion, a recess formed in the second side portion adjacent to the slot, the recess being adapted to receive a digit of an operator's hand;
a rotating control lever, a part of the control lever projecting through the slot and above the dome; and
a depression formed by the deck, the depression being adjacent to a side portion of the dome, the dome, recess, deck and depression forming a hand rest for use by an operator while manipulating the control lever.

2. The control console assembly of claim 1, wherein:
the recess includes a side edge which is generally parallel to the slot.

3. The control console assembly of claim 1, wherein:
the slot extends along a longitudinal axis; and
the first side portion having a length in a direction parallel to the longitudinal axis which is longer than a corresponding length of the center portion.

4. The control console assembly of claim 1, wherein:
the center portion and the first portion are connected together by a side wall, the side wall facing towards the center portion and lying in a vertical plane.

5. The control console assembly of claim 1, wherein:
the recess has a concave curved bottom edge where the recess is joined to the deck, and the recess extending to an apex adjacent to a top surface of the second side portion.

6. The control console assembly of claim 1, wherein:
the center portion has a curved surface with a center of curvature at the pivot axis.

7. The control console assembly of claim 1, wherein:
the dome has a transverse length in a direction transverse to the slot axis and the first portion has a longitudinal length which is parallel to the slot axis, the transverse length being longer than longitudinal length.

8. The control console assembly of claim 1, wherein:
the deck comprises an upper deck and a lower deck, a finger of the lower deck extending around an edge of the dome first side portion, said finger being bordered by a side wall and the first side portion.

9. The control console assembly of claim 8, wherein:
the finger is adapted to receive an edge portion of a operator's hand while manipulating the control lever.

10. The hand rest of claim 1, wherein:
a front part of the first portion and a front part of the center portion are joined together to form continuous surface; and
a rear part of the first portion and a rear part of the center portion are separated by a dome wall.

11. The hand rest of claim 10, wherein:
the dome wall lies in a plane which is perpendicular to the pivot axis of the lever.

12. The hand rest of claim 10, wherein:
a portion of the slot lies between the dome wall and the recess.

13. The hand rest of claim 1, wherein:
the deck has an upper surface and a lower surface recessed with respect to the upper surface and joined to the upper surface by a deck wall, the deck wall being spaced apart from a lower edge of the first side portion.

14. The hand rest of claim 13, wherein:
the deck wall faces towards the slot.

* * * * *